UNITED STATES PATENT OFFICE.

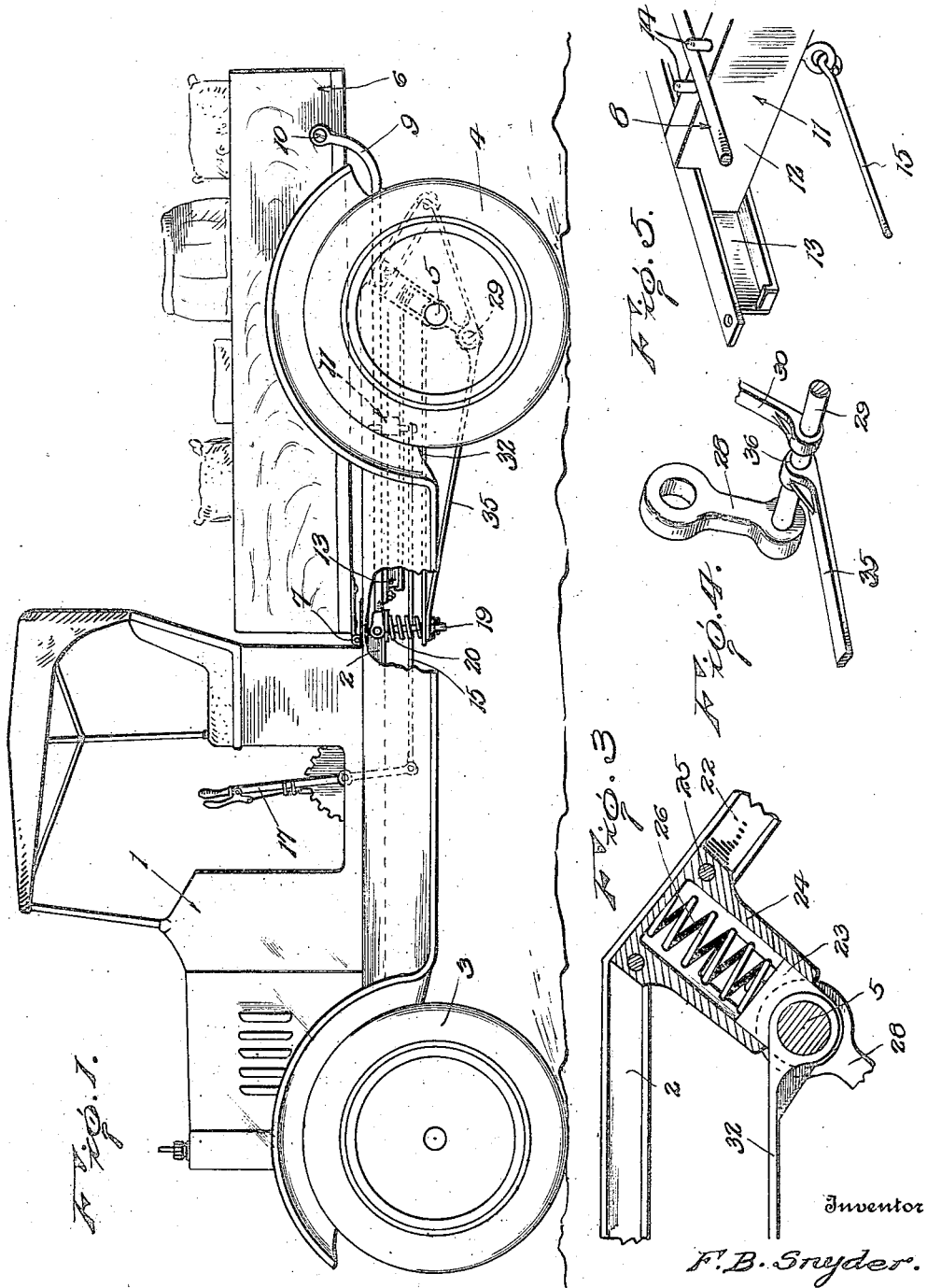

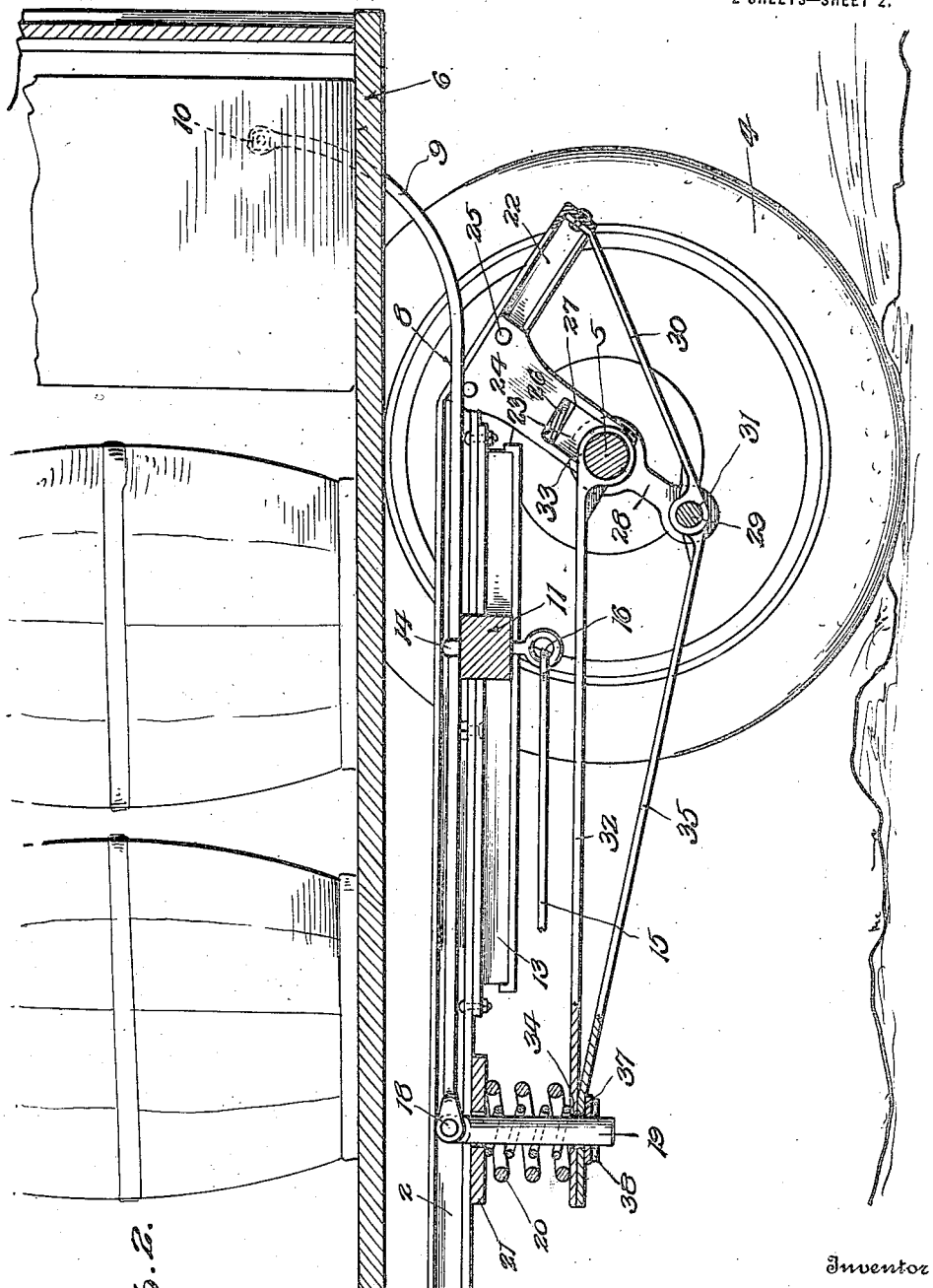

FRANK B. SNYDER, OF SOUTH ALTOONA, PENNSYLVANIA.

AUXILIARY PROPELLING MEANS FOR MOTOR VEHICLES.

1,422,795.            Specification of Letters Patent.      Patented July 11, 1922.

Application filed October 14, 1920. Serial No. 416,945.

*To all whom it may concern:*

Be it known that I, FRANK B. SNYDER, a citizen of the United States, residing at South Altoona, in the county of Blair and State of Pennsylvania, have invented certain new and useful Improvements in Auxiliary Propelling Means for Motor Vehicles, of which the following is a specification.

This invention relates to improvements in motor vehicles and more particularly to a means for yieldably supporting the body of the vehicle in such a manner as to facilitate the passage of the vehicle over the road surface.

A further object of the invention is to so mount the body of a vehicle that the body will be more effectually cushioned and will ride more evenly and smoothly than it would if supported by the springs of the usual types.

In the accompanying drawings:

Figure 1 is a side elevation of a motor vehicle equipped with the invention;

Figure 2 is a detail vertical longitudinal sectional view through the rear portion of the vehicle;

Figure 3 is a detail vertical sectional view through a portion of the device;

Figure 4 is a perspective view of a portion of the device;

Figure 5 is a perspective view illustrating the shiftable fulcrum of the device.

In the drawings, the numeral 1 indicates in general a motor vehicle of any ordinary type provided with a chassis frame 2 comprising the usual side beams. The front wheels of the vehicle are indicated by the numeral 3 and the rear wheels by the numeral 4, these latter wheels being mounted upon the axle 5 in the usual manner although the manner of mounting this axle differs materially from the usual construction. The body of the vehicle is indicated in general by the numeral 6 and the said body is hingedly connected as at 7 at its forward end to the chassis frame so that the rear end of the body will be free to move in an up and down direction.

The body is yieldably supported in a slightly elevated position by means of levers which are indicated in general by the numeral 8 and which are arranged at opposite sides of the chassis frame, the rear end portions of the levers being curved upwardly and rearwardly as at 9 and pivotally connected, as at 10, in any suitable manner with the opposite sides of the body 6. The levers 8 are supported upon the fulcrum which is indicated in general by the numeral 11. This fulcrum 11 comprises a bolster beam 12 which extends transversely of the chassis frame and is slidably mounted at its ends in channelled guides 13 secured upon the under sides of the respective side beams of the said chassis frame. Each lever 8 seats between a pair of guide pins or studs 14 upon the upper side of the fulcrum beam 11 and thus lateral displacement of the levers is effectually prevented. In order that the fulcrum beam may be shifted longitudinally in the channelled guides 13 to vary the point of location of the fulcrum for the levers 8 under conditions to be presently explained, a connecting rod 15 is connected at one end, as at 16, with the fulcrum beam 11 and at its other end is connected to an operating lever 17 mounted within the vehicle within convenient reach of the operator.

The levers 8 are pivotally connected at their forward ends, as at 18, with the upper ends of plungers 19 yieldably held depressed by springs 20 which operate against a plate 21 arranged transversely beneath the chassis frame and through which plate the plungers 19 are slidably fitted, as most clearly shown in Figure 2 of the drawings. At this point it will be evident that the levers 8 are fulcrumed upon the beam 12 and that downward movement of the body 6 which is supported by the levers is yieldably resisted by the springs 20. It will also be evident that by rocking the lever 17, the fulcrum beam 12 may be shifted in its guides so as to adjust this beam longitudinally of the levers 8 and thus increase or decrease the leverage which the body 6 will be capable of exerting against the springs 20 through the medium of the levers 8 in the up and down movement of the body.

The rear end portions of the side bars of the chassis frame are formed to extend downwardly and rearwardly at an angle as indicated by the numeral 22. Bearing heads 23 are fitted onto the axle 5 and work slidably in boxes 24 which are secured as at 25 to the portions 22 of the side bars of the chassis frame. Springs 26 are arranged within the boxes 24 and bear against the inner end walls of the boxes and against the bearing heads 23 and serve to cushion the movement of the boxes 24 with relation to the said bearing heads in the up and down movement of the chassis frame 2 with relation to the axle 5 and vice versa. The boxes are provided in their opposite side walls with slots or openings 27 to receive the axle 5 and permit of up and down movement of the axle with relation to the boxes.

The numeral 28 indicates a pair of hangers loosely fitted at their upper ends to the axle 5 and supporting between them and their lower ends a cross rod 29. Brace bars 30 are connected at their lower ends, as at 31, loosely with the cross rod 29 and at their upper ends are secured in any suitable manner to the rear end of the chassis frame.

The numeral 32 indicates a pair of reach bars which are connected at their rear ends, as at 33, with the axle 5 and which at their forward ends are loosely fitted, as at 34, to the lower ends of the plungers 19 below the springs 20. Other reach bars 35 are connected at their rear ends as at 36 to the cross rod 29 and at their forward ends are loosely fitted as at 37 to the said lower ends of the respective plungers 19, any suitable means as for example a pin or key 38 being provided upon the lower end of each plunger to hold the forward ends of the reach bars 32 and 35 assembled therewith.

From the foregoing description of the invention it will be evident that the body 6 of the vehicle is adapted to have up and down movement upon its hinge connection 7 and that the body is yieldably supported by the levers 8. As the body moves upwardly and downwardly, this movement being brought about through the passage of the vehicle over inequalities in the road surface, the levers 8 will be rocked upon the fulcrum beam 12 against the tension of the springs 20 and the movement of the body will thus be cushioned. At the same time the force created through each downward movement of the body 6 is transmitted through the boxes 24 in a downward and forward direction against the axle 5. As previously stated, by shifting the fulcrum beam 12, the point of location of the fulcrum for the levers 8 may be varied. Thus when the body is supporting only a relatively light load, the fulcrum beam will be shifted through operation of the lever 17 to a forward position thus adapting the movement of the vehicle body to exert increased leverage, whereas if the body is relatively heavily loaded, the fulcrum may be shifted to the rear position to obtain the opposite result.

It will be understood that the device embodying the invention serves as a highly effectual means for cushioning the body of the vehicle and it will further be noted that a vehicle equipped with the invention may be more readily and smoothly driven over rough roads than would be possible if the body were supported by the usual types of springs.

Having thus described the invention, what is claimed as new is:

1. In a vehicle, a chassis frame, an axle, a body movable up and down with relation to the frame and axle, a lever supporting the body, means yieldably resisting movement of the lever, and a variable fulcrum for the lever.

2. In a vehicle, a chassis frame, an axle, a body movable up and down with relation to the frame and axle, a lever supporting the body, means yieldably resisting movement of the lever, a variable fulcrum for the lever, and means for adjusting the fulcrum.

3. In a vehicle, a chassis frame, an axle, a body movable up and down with relation to the frame and axle, a lever supporting the body, means yieldably resisting movement of the lever, a shiftable fulcrum supporting the lever, and manually operable means for shifting the fulcrum.

In testimony whereof I affix my signature.

FRANK B. SNYDER. [L. S.]